UNITED STATES PATENT OFFICE.

KARL SCHNITZSPAHN, OF OFFENBACH-ON-THE-MAIN, GERMANY, ASSIGNOR TO THE CORPORATION OF CHEMISCHE FABRIK GRIESHEIM ELEKTRON, OF FRANKFORT-ON-THE-MAIN, GERMANY.

PROCESS OF MAKING PHENYLGLYCIN SALTS.

1,011,500.　　　　Specification of Letters Patent.　　Patented Dec. 12, 1911.

No Drawing.　　Application filed February 4, 1911. Serial No. 606,609.

*To all whom it may concern:*

Be it known that I, KARL SCHNITZSPAHN, doctor of philosophy, chemist, a subject of the German Emperor, and resident of Offenbach-on-the-Main, in the Grand Duchy of Hesse, Germany, with post-office address Mainstrasse No. 181, have invented new and useful Improvements in Processes of Making Phenylglycin Salts, of which the following is a specification.

No process has hitherto been known for directly producing phenylglycin salt of high percentage and free from alkalichlorid, (as is necessary for making indoxyl-melts), from phenylglycin-melts, obtained by reacting with approximately three or more molecular proportions of anilin upon one molecular proportion of chloracetic acid, which melts contain besides phenylglycin (in form of its anilin salt) phenylglycinanilid. In working up such melts, two processes have been known hitherto. According to the one process the phenylglycinanilid is filtered off after rendering the melt alkalin and after distilling off the anilin, and the free phenylglycin is precipitated from the filtrate by means of acids. In this process a separate working up of the phenylglycinanilid is necessary, whereby considerable losses are sustained by the solubility of the phenylglycin in water. According to the other process, described in Letters Patent 818341, the production of phenylglycin salts is performed with advantage in such manner that the entire obtained phenylglycin is converted into its anilid which is separated and split off by saponification, whereby losses of phenylglycin and the separate working up of the anilid are avoided.

I have found a new process by which high percented salts of phenylglycin free of alkali chlorid in good yields are obtained directly from melts, containing, phenylglycin (in form of anilin salt) besides phenylglycin anilid and hydrochlorid of anilin. In carrying out my process it is not necessary to transform as hitherto the formed phenylglycin into the anilid by a troublesome process which, as described in the specification of American Letters Patent No. 818341, preferably may be performed *in vacuo*. It is also not necessary to separate the anilid and the glycin and to work them up in separate processes.

The new process is based on the fact, that, by addition of one equivalent proportion of a neutralizing agent, like an alkali hydroxid, an earth-alkali-hydroxid, an earth-alkali-oxid or a carbonate of the aforesaid bases for instance, to one molecular proportion of chloracetic acid used in the melt, obtained by reacting upon one molecular proportion of chloracetic acid with approximative three molecular proportions of anilin or more the alkali, earth alkali or carbonate exclusively reacts upon the hydrochlorid of anilin which is formed in the process according to the chemical equation:

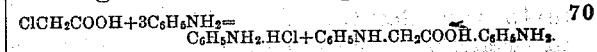

$$ClCH_2COOH + 3C_6H_5NH_2 = C_6H_5NH_2.HCl + C_6H_5NH.CH_2COOH.C_6H_5NH_2.$$

The neutralizing agent does not react upon the anilin salt of phenylaminoacetic acid, being formed in the process at the same time and does not transform it into the alkali salt of phenylaminoacetic acid. Owing to this smooth transformation it is possible to obtain from melts, containing phenylglycin (in form of anilin salt) besides phenylglycin anilid and hydrochlorid of anilin by a very simple and profitable process salts of phenylglycin free of alkalichlorid by addition of approximative one equivalent proportion of an alkali- or earth-alkalihydroxid, or a carbonate of the aforesaid bases.

The anilin set free from hydrochlorid of anilin by means of alkali, acts in opportune manner as solvent for the phenylglycin-anilin salt and anilid. Therefore the oily mixture of phenylglycinanilin salt, anilid and anilin can easily be separated from the formed alkalichlorid and can be obtained free of alkalichlorid, only small quantities of phenylglycinalkali remaining mixed with alkali-chlorid. The separated oily mixture may be transformed into a salt of phenylglycin by heating it up to about 130° C. under pressure or without by means of overheated steam together with concentrated caustic alkali lye the proportion of which is calculated to the amount of phenylglycinanilin salt and anilid contained in the mixture. After distilling off the excess of anilin by means of steam the phenylglycin salt is obtained in pure condition and good yield.

The new process may be performed in the following manner: For instance the alkali or earth alkali-hydroxid, earth alkali oxid or carbonate of the aforesaid bases is introduced in powdered condition into the ready melt. The resulting alkali-chlorid is filtered off in case of being insoluble in the melt. If the alkali chlorid is dissolved in the melt, like calcium-chlorid for instance, water is added and the aqueous solution of the alkali-chlorid filtered off from the mixture of anilin, phenylglycinanilin salt and anilid or an aqueous solution or suspension of the alkali or earth-alkali hydroxid or carbonate is added to the melt or the ready melt is poured into the alkaline solution or suspension.

The following examples will serve to show how my invention can be carried into practical effect; but my invention is not confined to these examples. The parts are by weight.

Example I: To a melt, obtained by heating together 350 parts of anilin 100 parts of chloracetic acid and 200 parts of xylene up to about 130° C., whereby about 100 parts of phenylglycinanilin salt and 119 parts of anilid are obtained, are poured at a temperature of 90° to 95° C., while stirring 350 parts of a lye containing 11.8 per cent. of caustic soda. The oil is separated from the hot aqueous sodium chlorid-solution and directly transformed into phenylglycin potassium by means of 109 parts of a lye containing 50 per cent. of caustic potash. Instead of caustic sodium lye may be used with the same result other alkali or earth alkali metal compounds, like sodium carbonate, potassium carbonate, caustic potassium lye, ammonia, slaked lime, or calcium carbonate for instance.

Example II: To a hot melt, obtained from 500 parts of anilin and 100 parts of chloracetic acid at 150° C., containing about 52 parts of phenylglycinanilin salt and 164 parts of anilid are poured while stirring 350 parts of a suspension of slaked lime, containing 29.6 parts of calcium oxid. As soon as the reaction of the calcium hydroxid upon the hydrochlorate of anilin is completed the formed oil is separated from the hot aqueous calcium-chlorid solution and directly transformed into phenylglycin potassium by means of 110 parts of a solution containing 50 per cent. of caustic potash. Instead of slaked lime other alkali or earth-alkali metal compounds may be used with the same result, or 29.6 parts of powdered calcium oxid may be added to the melt and the necessary amount of water poured in afterward.

Example III: Into a hot melt obtained from 500 parts of anilin and 100 parts of chloracetic acid about at 120° C. containing about 135 parts of phenylglycinanilin salt and 88 parts of anilid are introduced 61 parts of calcined sodium carbonate. As soon as the reaction of the carbonate upon the hydrochlorid of anilin is completed the formed sodium-chlorid is filtered off from the hot mixture washed out with anilin and the oily filtrate transformed into phenylglycinpotassium directly by means of 110 parts of a solution containing 50 per cent. of caustic potash.

Example IV: A melt of phenylglycin obtained as described in Example II is poured while stirring into a hot solution of 69 parts of calcined sodium carbonate in 210 parts of water. As soon as the hydrochlorate of anilin is converted in sodium chlorid and free anilin, the formed oil is separated from the aqueous solution of sodium chlorid and worked up as described in Example II.

Now what I claim and desire to secure by Letters Patent is the following:

The process for the manufacture of phenylglycin salts, consisting in treating melts, obtained in the well known manner from at least three molecular proportions of anilin and one molecular proportion of chloracetic acid, which melts contain phenylglycinanilid besides phenylglycinanilin salt, with approximately one equivalent proportion of a neutralizing agent calculated for one molecular proportion of chloracetic acid used in the process separating the mixture of phenylglycinanilin salt and phenylglycinanilid from the metal-chlorid and transforming the mixture being free of metal chlorid, into phenylglycinalkali salt by means of caustic alkali lye.

In testimony, that I claim the foregoing as my invention, I have signed my name in presence of two witnesses, this twentieth day of January 1911.

KARL SCHNITZSPAHN.

Witnesses:
HERMANN WEIL,
ROBERT BÜHL.